(12) United States Patent
Steelman et al.

(10) Patent No.: US 8,778,122 B2
(45) Date of Patent: Jul. 15, 2014

(54) ADHERING GRAPHIC FILMS ON IRREGULAR SUBSTRATES

(75) Inventors: Ronald S. Steelman, Woodbury, MN (US); John A. Nielsen, Woodbury, MN (US); Frank T. Sher, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1044 days.

(21) Appl. No.: 11/682,256

(22) Filed: Mar. 5, 2007

(65) Prior Publication Data

US 2008/0000583 A1  Jan. 3, 2008

Related U.S. Application Data

(63) Continuation-in-part of application No. 11/427,398, filed on Jun. 29, 2006.

(51) Int. Cl.
| | |
|---|---|
| *B29C 65/02* | (2006.01) |
| *B29C 65/52* | (2006.01) |
| *B32B 37/02* | (2006.01) |
| *B32B 37/06* | (2006.01) |
| *B32B 37/10* | (2006.01) |
| *B32B 37/14* | (2006.01) |
| *B32B 38/14* | (2006.01) |
| *B29C 65/44* | (2006.01) |
| *B32B 37/15* | (2006.01) |

(52) U.S. Cl.
USPC .................. 156/278; 156/277; 156/297

(58) Field of Classification Search
USPC ........................ 156/277, 278, 297
See application file for complete search history.

(56) References Cited

U.S. PATENT DOCUMENTS

| 754,403 | A | 3/1904 | Coe |
| 1,672,093 | A | 6/1928 | Sadtler |
| 1,895,045 | A | 1/1933 | Moore |
| 2,123,415 | A | 7/1938 | Gorbatenko |
| 2,372,737 | A | 4/1945 | Phillips, Jr. |
| 2,714,559 | A | 8/1955 | Sheffield |
| 3,853,669 | A | 12/1974 | Werstlein |
| 3,861,988 | A | 1/1975 | Preisler |

(Continued)

FOREIGN PATENT DOCUMENTS

| GB | 1135928 | 12/1968 |
| JP | 58-017129 | 2/1983 |

(Continued)

OTHER PUBLICATIONS

English translation of JP10-252743; Sep. 22, 1998.*

(Continued)

*Primary Examiner* — Sonya Mazumdar
(74) *Attorney, Agent, or Firm* — Steven A. Bern; Colene H. Blank; William D. Miller

(57) ABSTRACT

Methods of adhering graphic film on an irregular substrate are disclosed. The methods includes providing a polymer film composite having two or more layers with at least one layer having a glass transition temperature of at least about 40° C., the polymer film composite having a first side and a second side, and an adhesive layer disposed on the second side. Then the method includes, positioning the adhesive layer against the irregular substrate, heating the polymer film composite, and pressing the heated polymer film against the irregular substrate.

14 Claims, 4 Drawing Sheets

(56) References Cited

U.S. PATENT DOCUMENTS

| | | | |
|---|---|---|---|
| 3,962,016 | A | 6/1976 | Alfter |
| 4,181,752 | A | 1/1980 | Martens |
| 4,204,904 | A | 5/1980 | Tabor |
| 4,261,783 | A | 4/1981 | Finke |
| 4,511,425 | A | 4/1985 | Boyd |
| 4,751,121 | A | 6/1988 | Kühnel |
| 4,867,816 | A | 9/1989 | Suiter |
| 4,994,514 | A | 2/1991 | Blackwell |
| 5,019,295 | A | 5/1991 | Yoshida |
| 5,034,077 | A | 7/1991 | Pata |
| 5,268,512 | A | 12/1993 | Miki |
| 5,284,689 | A | 2/1994 | Laurash |
| RE34,884 | E | 3/1995 | Coleman |
| 5,445,704 | A | 8/1995 | Dizon |
| 5,693,141 | A | 12/1997 | Tramont |
| 5,800,919 | A | 9/1998 | Peacock |
| 5,814,184 | A | 9/1998 | Denkins |
| 5,972,472 | A | 10/1999 | Uschold |
| 6,177,189 | B1 | 1/2001 | Rawlings |
| 6,221,198 | B1 * | 4/2001 | Gryska et al. ............ 156/325 |
| 6,270,871 | B1 | 8/2001 | Scholz |
| 6,379,444 | B1 | 4/2002 | Adkins |
| 6,461,706 | B1 * | 10/2002 | Freedman et al. ............ 428/40.1 |
| 6,474,389 | B1 * | 11/2002 | Steelman et al. ............ 156/382 |
| 6,520,234 | B1 | 2/2003 | Anderson |
| 6,663,947 | B2 | 12/2003 | Freedman |
| 6,709,726 | B1 * | 3/2004 | Dronzek et al. ............ 428/40.1 |
| 6,808,658 | B2 | 10/2004 | Stover |
| 6,824,638 | B1 | 11/2004 | Anderson |
| 2002/0092611 | A1 | 7/2002 | Anderson |
| 2002/0098348 | A1 | 7/2002 | McReynolds |
| 2004/0191664 | A1 * | 9/2004 | Hosoi et al. ............ 430/124 |
| 2006/0063673 | A1 | 3/2006 | Hidetoshi |
| 2007/0000606 | A1 | 1/2007 | Steelman |

FOREIGN PATENT DOCUMENTS

| | | |
|---|---|---|
| JP | 58-045020 | 3/1983 |
| JP | 07-001590 | 1/1995 |
| JP | 10-252743 | 9/1998 |
| KR | 10-2003-0036639 | 5/2003 |
| WO | WO 92-17870 | 10/1992 |
| WO | WO 97-33947 | 9/1997 |
| WO | WO 98-29516 | 7/1998 |
| WO | WO 99-20466 | 4/1999 |
| WO | WO 9920466 A1 * | 4/1999 |
| WO | WO 00/43220 | 7/2000 |
| WO | WO 2008002793 A1 * | 1/2008 |

OTHER PUBLICATIONS

Brady, "Ten Steps to Successful Vinyl Truck Lettering", SignCraft Magazine, Jan./Feb. 1994, Issue 74, 3 pages.

Wharenbrock et al.; "Thermal Conductivity on Material-Insulation-Thermal-Silicone Rubber Foam, Fiberglas Batting Composite, Epoxy Bonded Microbaloon", Accession No. AD0287150, Aug. 25, 1959, 1 page.

* cited by examiner

ADHERING GRAPHIC FILMS ON IRREGULAR SUBSTRATES

CROSS REFERENCE TO RELATED APPLICATION

This application is a continuation-in-part of U.S. application Ser. No. 11/427,398, filed Jun. 29, 2006, now pending, the disclosure of which is incorporated by reference in its entirety herein.

BACKGROUND

The present disclosure relates generally to displaying graphics on irregular substrates.

Adhesive-coated plastic films, especially vinyl films with pressure sensitive adhesives or pressure-activated adhesives, are applied to a variety of surfaces for a variety of reasons such as advertisement, decoration, protection, and the like. Most of these surfaces tend to be fairly smooth. However, there are many surfaces that are non-planar or irregular and may include imperfections, seams, rivets, and other protrusions or indentations.

When a film is applied over and adhered to these irregular surfaces, the film may be strained to bring the adhesive into contact with the irregular surface. Residual stress in the film at such irregular surface locations may exceed the holding power of the adhesive resulting in the film lifting off the surface to which it was adhered. This may result in an imperfect appearance.

SUMMARY

In an illustrative but non-limiting example of the disclosure, a method of adhering a film or graphic film on an irregular substrate is disclosed. A polymer film or layer within a polymer film composite having a glass transition temperature of at least 40° C. is provided. A polymer film composite is a composite of at least two layers of polymer film, bonded together using methods known in the art. The polymer film or polymer film composite has an adhesive layer disposed on a second side of the film or composite. An image may be included on the polymer film opposite the adhesive, on the polymer film composite opposite the adhesive, or between layers of the polymer film composite. The adhesive layer may be positioned against the irregular substrate such that the polymer film or polymer film composite at least partially bridges irregularities in the irregular substrate and the polymer film or polymer film composite is heated. The heated polymer film or polymer film composite is pressed against the irregular substrate such that much of the adhesive layer comes into contact with the irregular substrate and adheres to the irregular substrate.

In another illustrative but non-limiting example of the disclosure, a method of adhering a film onto an irregular substrate is disclosed. The method includes providing a first polymer film having a glass transition temperature of less than about 30° C., the polymer film having a first side and a second side, an adhesive layer disposed on the second side, providing a second polymer film having a glass transition temperature of at least about 40° C., laminating the second polymer film to the first polymer film to form a polymer film composite, positioning the adhesive layer of the first polymer film against the irregular substrate, heating the polymer film composite, and pressing the heated polymer film against the irregular substrate such that much of the adhesive layer comes into contact with the irregular substrate and adheres to the irregular substrate.

In another illustrative but non-limiting example of the disclosure, a method of adhering a film or graphic film onto an irregular substrate is disclosed. The method includes providing a first polymer film having a glass transition temperature of less than about 30° C., the polymer film having a first side and a second side, an adhesive layer disposed on the second side, printing an image on the first side, providing a second polymer film having a glass transition temperature of at least about 40° C., laminating the second polymer film to the first polymer film over the image to form a polymer film composite, positioning the adhesive layer of the first polymer film against the irregular substrate, heating the polymer film composite, and pressing the heated polymer film against the irregular substrate such that the heated polymer film adheres to the irregular substrate.

The above summary of the disclosure is not intended to be all-encompassing. Other details of the disclosure will be evident to those of ordinary skill in the art from the following detailed description together with the drawings.

BRIEF DESCRIPTION OF THE DRAWINGS

The disclosure may be more completely understood in consideration of the following detailed description of the accompanying drawings, in which.

DETAILED DESCRIPTION

Figure 1:
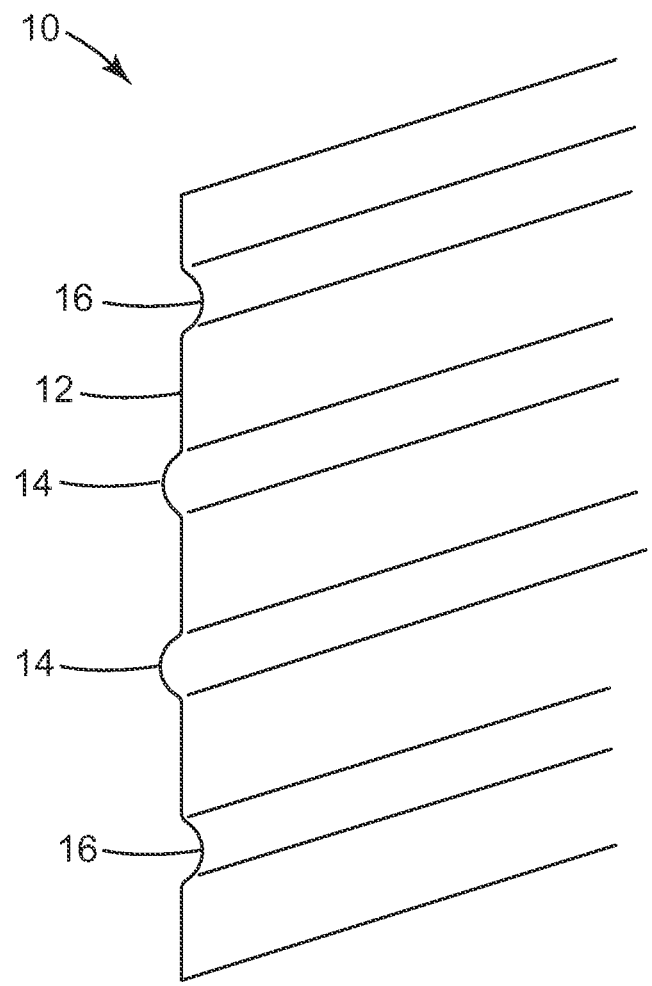
FIG. 1 is a schematic view of an illustrative but non-limiting irregular substrate as described herein.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "polymer" will be understood to include polymers, copolymers (e.g., polymers formed using two or more different monomers), oligomers and combinations thereof, as well as polymers, oligomers, or copolymers that can be formed in a miscible blend. In a blend of polymers, the term "polymer" will refer to the continuous phase polymer in the blend.

The disclosure pertains to adhering films or graphic films on irregular substrates. An irregular substrate may include a non-planar surface. In some instances, an irregular substrate may include a planar or substantially planar surface and one or more non-planar elements that are disposed on or in the planar surface. Some or all of the non-planar elements may extend into, or below, the planar surface. Some or all of the non-planar elements may extend above the planar surface.

In some instances, the irregular substrate may be a building or construction substrate, such as a wall. Examples of irregular substrates include masonry such as concrete and brick and stone. The irregular substrate may be a metallic substrate, such as a side of a truck or trailer. In some instances, the side of a truck or trailer may be curved. In some cases, the side of a truck or trailer may be substantially planar, with non-planar elements such as seams, rivets, screw heads and the like.

The disclosure pertains to adhering a film or graphic film on an irregular substrate. Any suitable polymer film composite having two or more layers may be used. In some embodiments, the graphic film is a colored film or imaged film. In some instances, the one or more polymer film layers may be made from a material having a glass transition temperature of at least about 40° C. In some cases, the one or more polymer film layers may be made from a material having a glass transition temperature of at least about 60° C. or even at least about 80° C. In some embodiments, the one or more polymer film layers may be made from a material having a glass transition temperature of less than about 30° C. and one or more polymer film layers may be made from a material having a glass transition temperature of at least about 40° C. It should be recognized that some polymeric materials may have more than one glass transition temperature, or temperature at which portions of the polymer may soften. For the purposes of referring to glass transition temperature herein, it is intended that the temperature in question for a particular material is the temperature at which the continuous phase has softened. i.e. the bulk of the material.

In some embodiments, the polymer film composite comprises one or more layers of a polymer with a glass transition temperature of at least 40° C. with one or more layers of a polymer film with a glass transition temperature of less than 30° C. The layer with the lower glass transition temperature may provide enhanced properties for adhesion, print receptivity, and the like. Pigments or colorants may be included in the polymer film composite. In specific examples, the polymer film composite includes a plasticized polyvinyl chloride ("PVC") film with a glass transition temperature below 30° C. The PVC film is then imaged. The imaged side of the film is then overlaminated with a polymer film with a glass transition temperature of above 40° C. The lamination of the overlaminate can be facilitated by any of the known lamination methods such as a combination of heat and pressure thereby softening either or both of the films, by using a heat activated adhesive, or by using a pressure sensitive adhesive.

Polymer film layers may have a thickness of about 5 micrometers to about 100 micrometers. In some instances, the polymer film layers may be at least substantially transparent to visible light. A polymer film composite may contain a layer of polymer film with a Tg greater that 40° C. that is between 5 and 100 microns thick.

Examples of suitable polymers with Tg above 40° include polyvinyl chloride, poly(meth)acrylate films such as poly (methyl methacrylate), polyester films, polycarbonate sheets, styrene sheets and the like. Examples of polymers with less Tg of less than 30° C. include plasticized PVC, polyethylene and other polyolefins, plasticized acrylics, and the like.

An adhesive layer such as a pressure sensitive adhesive may be applied to the polymer film or polymer film composite to adhere the polymer film to the irregular substrate or to another film that also has an adhesive that may be adhered to the irregular substrate. Any suitable pressure sensitive adhesive may be used, providing the particular pressure sensitive adhesive used has adequate adherence to both the polymer film and the irregular substrate to which the adhesive layer will be secured. In some instances, the pressure sensitive adhesive may be at least substantially transparent to visible light. A transparent adhesive may be used, for example, if the polymer film composite is also transparent, and it is desired that the irregular substrate be visible through the adhesive and the polymer film composite.

In some cases, the pressure sensitive adhesive may be pigmented to appear a particular color. For example, the pressure sensitive adhesive may include titanium dioxide, and thus will appear white. A white-tinted adhesive may be applied to a substantially clear polymer film, for example, to provide a largely white backdrop for a printed image. In some instances, the pigmented adhesive may be laminated to the imaged side of the polymer film composite such that the polymer film composite serves as a protective layer for the image after the adhesive is attached to an irregular substrate. Suitable pigments for achieving other colors, such as yellow, orange, green, blue, red and the like are known.

A variety of pressure sensitive adhesives (PSAs) are useful. Pressure sensitive adhesives may be defined as material with the following properties: (1) aggressive and permanent tack, (2) adherence with no more than finger pressure, (3) sufficient ability to hold onto an adherand, (4) sufficient cohesive strength, and (5) require no activation by an energy source. Useful PSAs may exhibit pressure sensitive adhesive characteristics at either room temperature or at elevated temperatures.

PSAs are normally tacky at assembly temperatures, which is typically room temperature or greater (i.e., about 20° C. to about 90° C. or greater). Materials that have been found to function well as PSAs are polymers designed and formulated to exhibit the requisite viscoelastic properties resulting in a desired balance of tack, peel adhesion, and shear holding power at the assembly temperature and also retain properties such as peel adhesion and shear holding power at ambient temperatures. When elevated assembly temperatures are used, materials that exhibit little or no tack at room temperature may become pressure sensitive.

Examples of polymers useful in preparing pressure sensitive adhesives include natural rubber-, synthetic rubber- (e.g., styrene/butadiene copolymers (SBR) and styrene/isoprene/ styrene (SIS) block copolymers), silicone elastomer-, poly alpha-olefin-, and various (meth) acrylate- (e.g., acrylate and methacrylate) based polymers. Of these, (meth)acrylate-based polymer pressure sensitive adhesives are useful as a result of their optical clarity, permanence of properties over time (aging stability), and versatility of adhesion levels, to name just a few of their benefits.

In some instances, a release liner may be provided on the adhesive layer. The release liner can be formed of any useful material such as, for example, polymers or paper and may include a release coat. Suitable materials for use in release coats are well known and include, but are not limited to, fluoropolymers, acrylics and silicones designed to facilitate the release of the release liner from the pressure sensitive adhesive. The release coat may be designed to remain substantially adhered to the release liner after the transfer of the film to the surface to be finished.

The disclosure pertains to adhering a polymer film composite to an irregular surface. In many embodiments, one or more layers forming the polymer film composite is colored, printed, or imaged. In some instances, an image may be printed onto one or more of the polymer film layers. In some instances, the image may be delivered by any useful method such as, for example, piezo printing, screen printing, flexographic printing, lithographic printing, electrostatic printing, and the like. In some embodiments, printing may be accomplished using a variety of commercially available solvent ink-based piezo inkjet printers. Examples of suitable printers include those available from Idanit Technologies, Ltd. of Rishon Le Zion Israel, Raster Graphics of San Jose, Calif., Vutek Inc. of Meredith, N.H., Olympus Optical Co. Ltd. of Tokyo, Japan, and others.

Piezo inkjet printing principally relies on the use of four colors: cyan, magenta, yellow, and black (CMYK). However, to improve the resolution of images, some printers identified above also add two additional colors that are less concentrated relatives of the cyan and magenta inks, called "light cyan" and "light magenta." Additionally, printers and software can be configured to use "special" or "spot" colors that are specific hues based on large usage or commercial branding requirements.

A useful solvent-based piezo ink may include a pigment, a binder, an optional plasticizer, an organic solvent, a surfactant, and an antifoaming agent. Each of these components is described in greater detail hereinafter, and also in U.S. Pat. No. 6,379,444, which patent is incorporated by reference herein.

Organic solvents suitable for use in these inks described herein include ketones, aromatic hydrocarbons, ethers and esters (e.g., lactates, acetates, etc.). Examples of such solvents include cyclohexanone, propylene glycol monomethyl ether acetate (PM acetate), diethylene glycol ethyl ether acetate (DE acetate), isophorone, ethylene glycol butyl ether acetate (EB acetate), dipropylene glycol monomethyl acetate (DPM acetate), butyrol lactone, n-methyl pyrrolidone, alkyl acetate esters, and combinations thereof.

Fluorochemical surfactants may act as a flow agent to lower the surface tension of solvents. The lower surface tension allows the inks to flow out better on the receiving substrate. Such fluorochemical surfactants are solutes in solvents used in the present invention. Silicone and other organic surfactants may also be used.

The antifoaming agent includes an antifoaming oil and preferably a particulate material. The antifoaming agent may be dispersed in solvents to aid in minimizing foaming that might otherwise be caused by the fluorochemical surfactants. Antifoaming oils may be viscous, substantially water-insoluble liquids that can alter the surface tension of a fluid at room temperature. Silicone and other organic anti-foaming materials may also be used.

Piezo inks include one or more colorants, such as a pigment. A pigment can be an inorganic or organic, colored, white or black material that is practically insoluble in the medium (e.g., organic solvent) in which it is incorporated. Examples of suitable pigments include those useful in screen printing. An ink may include only one color pigment, or may include several different pigments to achieve a desired color. A variety of pigments are available. In some instances, an ink may also include one or more dyes.

Non-limiting examples of cyan pigments include IRGALITE GLG (Ciba Specialty Chemicals of Greensboro, N.C.) and SUNFAST 249-1284 (Sun Chemical Corporation of Fort Lee, N.J.). Non-limiting examples of magenta pigments include QUINDO magenta RV-6828 (Bayer of Pittsburgh, Pa.) and Magenta B RT-343-D (Ciba Specialty Chemicals). Non-limiting examples of yellow pigments include Fanchon Fast yellow Y5686 (Bayer) Fanchon yellow Y5688 (Bayer), and Sandorin 6GL (Clariant of Charlotte, N.C.). Non-limiting examples of black pigments include Pfizer lampblack LB-1011 (Pfizer of Easton, Pa.) and Raven 1200 (Columbian Chemicals of Atlanta, Ga.).

Piezo inks may include binders. A binder can be a resin that is compatible with pigment particles such that upon evaporation of volatile components of the ink, the binders form films of the deposited pigments on the receiving substrate. Advantageously, the binders described herein are outdoor durable. Non-limiting examples of suitable binders are polymeric resins such as vinyl-containing polymers (e.g, VYHH, VYNS, VYHD, and VAGH brand vinyl-containing resins from Dow Chemical, Midland, Mich.) and acrylic-containing polymers (e.g., polymethylmethacrylate, polymethylbutylacrylate, polyethylmethacrylate and copolymers thereof).

For some applications, it may be desirable that the inks are radiation curable. For example, radiation curable inks may be prepared by incorporating radiation curable materials including, but not limited to, monomers, oligomers, stabilizers, and optionally initiators and pigments into the ink. After the resulting inks have been applied to a receptor, they may be cured by exposure to radiation such as electron beam (e-beam) radiation. If photoinitiators or photocatalysts are also incorporated into the radiation curable inks, the resulting inks may be cured after they have been applied to a receptor by exposure to actinic radiation such as ultraviolet (UV) or visible-light.

The optional plasticizers may be polyesters that are compatible with the vinyl and acrylic resins and any other binder used along with the stabilizers and flow agents such that upon evaporation of volatile components of the ink, the plasticizers enhance the flexibility of the film formed from the deposited binder with pigments on the receiving substrate. The plasticizer also becomes part of the final ink film. Non-limiting examples of suitable plasticizers include UNIFLEX 312 brand plasticizer (Union Camp of Wayne, N.J.), PARAPLEX G-31 brand plasticizer (C. P. Hall of Chicago, Ill.) and PARAPLEX G-51 brand plasticizer (C. P. Hall).

To enhance durability of a printed image graphic, especially in outdoor environments exposed to sunlight or moisture, a variety of commercially available stabilizing chemicals can be added optionally to inks of the present invention. These stabilizers may include heat stabilizers, UV light stabilizers and biocides.

Heat stabilizers are commonly used to protect the resulting image graphic against the effects of heat and are commercially available as Mark V1923 brand stabilizer (Witco of Houston, Tex.), Synpron 1163 brand stabilizer (Ferro of Cleveland, Ohio), Ferro 1237 brand stabilizer (Ferro), and Ferro 1720 brand stabilizer (Ferro). UV light stabilizers are commercially available as UVINOL 400 brand benzophenone uv-absorber (BASF of Parsippany, N.J.) and TINUVIN 900 brand uv-absorber (Ciba Specialty Chemicals). An example of a commercially available biocide is VINYZENE SB-1 EAA Antimicrobial Additive for Plastics, available from Morton Thiokol, Inc.

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

FIG. 1 provides a schematic illustration of an irregular substrate 10 that may, as noted above, represent a building material, a vehicle or some other irregular surface upon which it may be desired to apply a printed image. The irregular substrate 10 may be seen as including a planar surface 12 and non-planar elements including protrusions 14 and indentations 16. The protrusions 14 may be considered as extending out of the plane of the planar surface 12 while the indentations 16 may be considered as extending into the plane of the planar surface 12.

It will be recognized, of course, that in some instances the irregular substrate 10 may include the protrusions 14 but not include any of the indentations 16. In other cases, the irregular substrate 10 may include indentations 16 but not include any protrusions 14. It will also be recognized that protrusions 14 and indentations 16, as illustrated, are highly stylized. In some cases, the protrusions 14 may represent rivets, screw heads, bolt heads, welding materials, seams, and the like. In some cases, the indentations 16 may represent dents, screw or bolt holes lacking a screw or bolt, and the like. If the irregular substrate 10 is masonry or stone, the protrusions 14 and/or the indentations 16 may represent grout lines, imperfections, voids, protruding particles and the like in the material.

Figure 2:
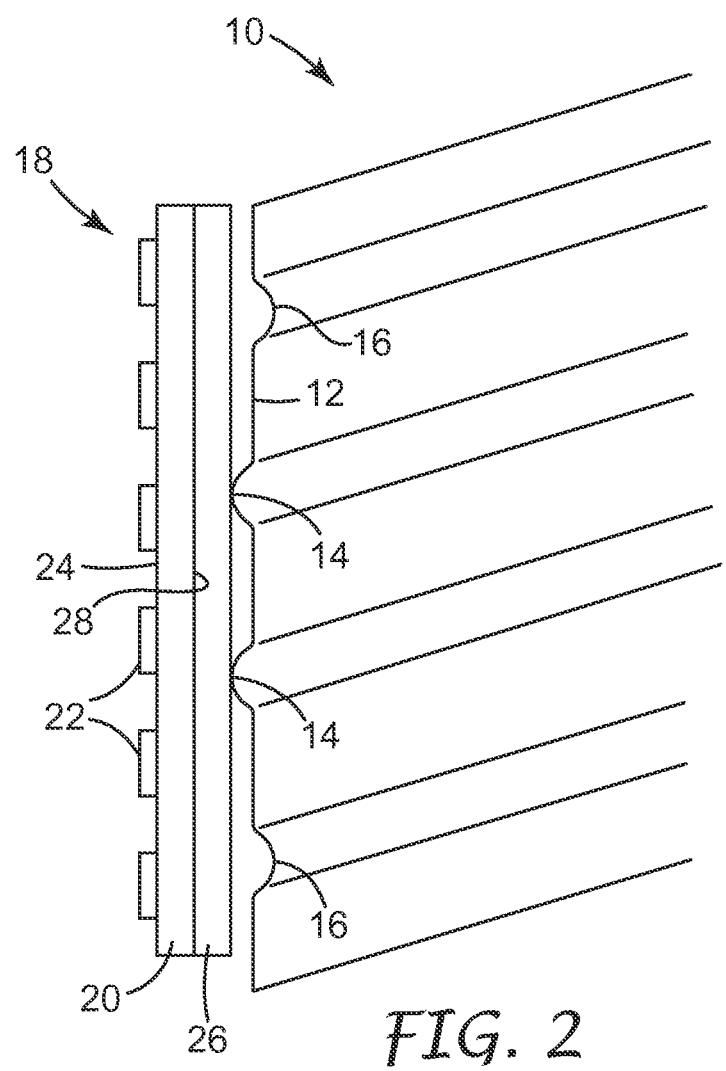
FIG. 2 is a schematic view of an illustrative but non-limiting laminate applied in partial contact with the irregular substrate of FIG. 1.

In FIG. 2, a laminate 18 has been positioned proximate the irregular substrate 10. The laminate 18 includes a polymer film or polymer film composite 20 having, as illustrated, an image 22 formed on a first side 24 of the polymer film 20 and an adhesive layer 26 disposed on an opposing second side 28 of the polymer film composite 20. The adhesive layer 26 may include any suitable pressure sensitive adhesive, as described above. As illustrated, it is considered that the adhesive layer 26 makes sufficient contact with at least a portion of the irregular substrate 10 to hold the laminate 18 in position. The adhesive layer 26 may be considered as being in partial contact with the irregular substrate 10. In some embodiments, the image 22 is disposed within the polymer film composite 20 (not shown), or between the polymer film composite 20 and the adhesive layer 26 (not shown).

Figure 3:
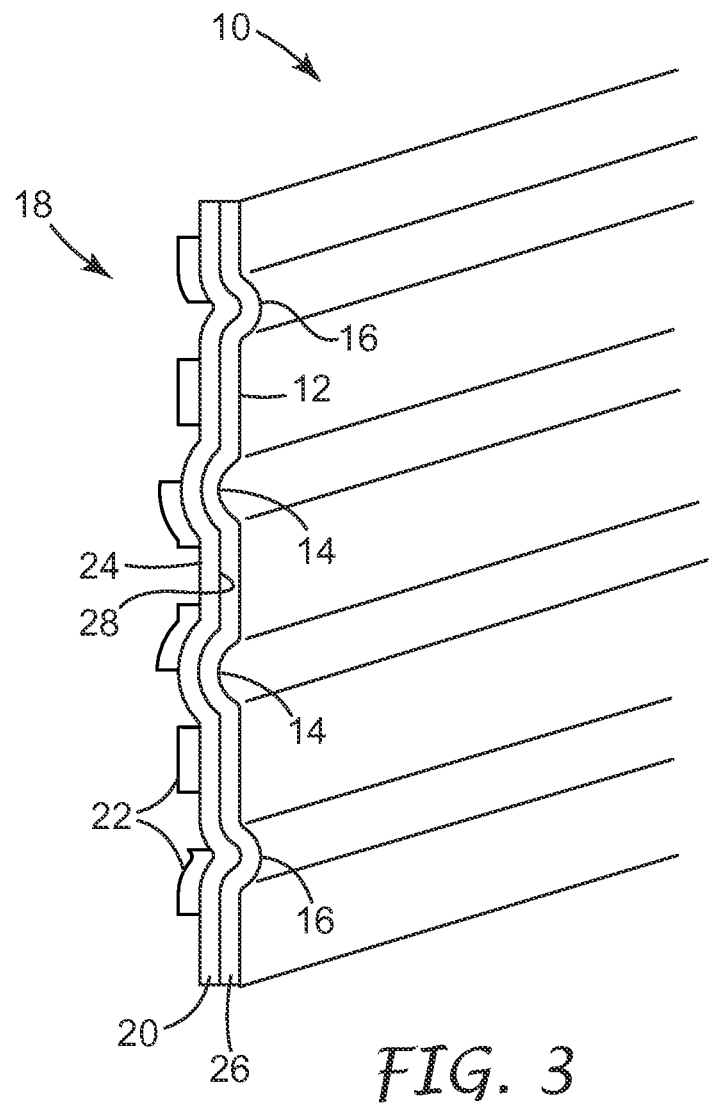
FIG. 3 is a schematic view of an illustrative but non-limiting laminate in intimate contact with the irregular substrate of FIG. 1.

To fully apply the laminate 18 to the irregular substrate 10, as shown in FIG. 3, it may be useful to heat the laminate 18, at least to soften the polymer film composite 20. Any suitable heat source may be used, provided the heat source can provide sufficient thermal energy to soften the polymer film composite 20 without causing the polymer film 20 to reach or exceed its melting point. In some instances, a heat source such as a heat gun that is capable of providing 1000° F. (about 540° C.) may be used. A heat source generating infrared energy may be used. A combination of hot air and infrared heat, such as generated by a catalytic heater may be used. It is considered that in some instances, all or substantially all of the polymer film composite 20 may be heated at once. In some cases, particularly if the laminate 18 is quite large, it may be useful to only heat a portion of the polymer film composite 20 at a time.

Once the polymer film composite 20, or a portion thereof, has been heated sufficiently to soften the polymer film 20 composite, the softened composite film 20 may be pressed against or into the irregular substrate 10 such that the adhesive layer 26 makes intimate contact with the irregular substrate 10. Pressure may be applied to the laminate 18 using any appropriate technique or device. In some cases, it may be useful to use a roller, block or brush to push and/or rub the laminate 18 onto the irregular substrate 10. A roller, block or brush may be formed from a material such as natural or synthetic rubber, urethane polymers, silicone polymers, fluoroelastomers, foamed or sponge versions of those rubbers, and the like. An open cell foamed silicone material having cells that are no larger than about 0.5 millimeters is particularly useful.

It may be useful to use a roller or such that is formed from a material having a relatively low thermal conductivity such that the roller, block or brush does not, itself, remove too much thermal energy from the heated, softened laminate 18. Instead, it is desired that the polymer film composite 20 remain softened until the adhesive layer 26 makes intimate contact with the irregular substrate 10. Once the adhesive layer 26 makes intimate contact with the irregular substrate 10, it is considered that the irregular substrate 10, being at or close to ambient temperature, will draw sufficient thermal energy out of the laminate 18 to permit the polymer film 20 to harden and thus permanently assume the profile of the irregular substrate 10.

FIGS. 2 and 3 provide an example of displaying a printed image on an irregular substrate 10 using a laminate 18. It will be recognized that the laminate 18 may be formed in several different ways, and may take several different forms. The subsequent Figures represent laminates that may be used in displaying a printed image on the irregular substrate 10.

Figure 4:
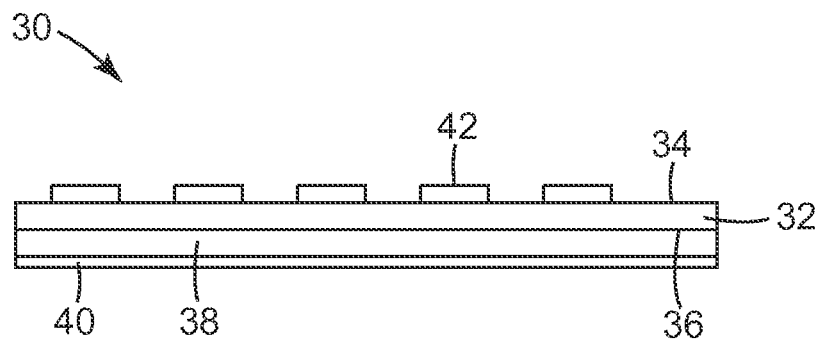
FIG. 4 is a schematic view of an illustrative but non-limiting laminate as described herein.

FIG. 4 shows a laminate 30 that includes a polymer film or polymer film composite 32 having a first side 34 and a second side 36. An adhesive layer 38 is disposed on the second side 36. While not required, a release liner 40, as discussed above, may be disposed on the adhesive layer 38 to protect the adhesive layer 38 and also to prevent undesired adhesion during printing. In many embodiments, an image 42 may be printed on the first side 34 using a solvent-based ink after the adhesive layer 38 is applied or otherwise disposed on the second side 36. In some cases, the solvent-based ink may penetrate a short distance into the first side 34 of the polymer film 32. In some instances, the solvent-based ink does not penetrate into the polymer film 32. The laminate 30 may then be applied to an irregular substrate 10 (FIG. 1) as described above.

Figure 5:
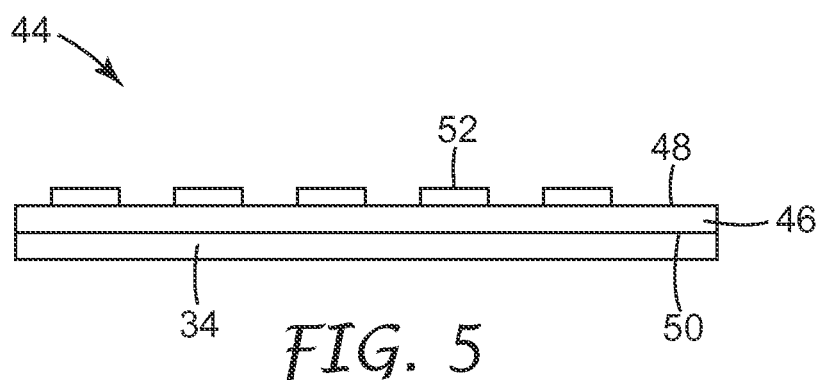
FIG. 5 is a schematic view of an illustrative but non-limiting laminate as described herein.
Figure 6:
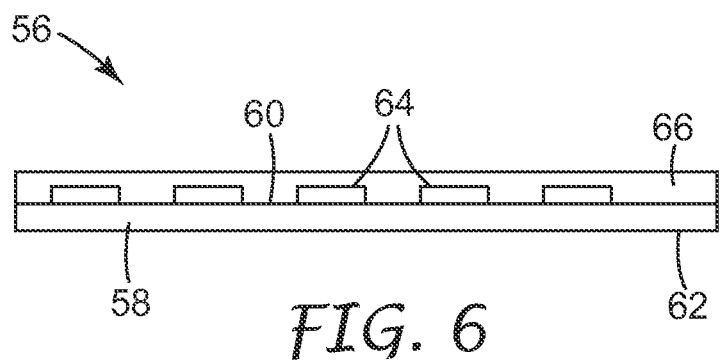
FIG. 6 is a schematic view of an illustrative but non-limiting laminate as described herein.

In some instances, an adhesive layer may be applied after the polymer film has been printed, as shown for example in FIGS. 5 and 6. In particular, FIG. 5 shows a laminate 44 that includes a polymer film or polymer film composite 46 having a first side 48 and a second side 50. A printed image 52 may be printed onto the first side 48 of the polymer film 46. An adhesive layer 54 may subsequently be disposed on the second side 50 of the polymer film 46. If desired, a release liner (not shown) may be applied over the adhesive layer 54. The laminate 44 may then be applied to an irregular substrate 10 (FIG. 1) as described above.

FIG. 6 illustrates a laminate 56 in which an adhesive layer and a printed image are formed on a single side of a polymer film or polymer film composite. Such a laminate 56 may, for example, provide additional protection for the printed image. The laminate 56 includes a polymer film 58 with a pressure sensitive adhesive side 62 and an opposing side 60. The polymer film 58 may be at least substantially transparent to visible light. The pressure sensitive adhesive side 62 may, once the laminate 56 is applied, be the exterior or exposed side of the polymer film 58.

A image 64 may be formed on the first side 60 of the polymer film 58. It will be recognized that the printed image 64 may, if desired, be printed in a mirror-image fashion so that the image appears correctly oriented when viewed through the polymer film 58 from the second side 62 thereof. The printed image 64 may be formed using solvent-based printing, as desired.

Once the image 64 has been formed, an overlaminate 66 with a Tg of 40 degrees centigrade or greater may be formed or otherwise disposed over the image 64. The overlaminate 66 may include any suitable adhesive such as a pressure sensitive adhesive. The overlaminate 66 may, include pigments to provide a desired background color for the image 64. As a result, the image 64 does not have to cover an entire surface of the polymer film 58 as the background color provided by the overlaminate 66 may contribute to the aesthetics of the laminate 56. The laminate 56 may then be applied to the irregular substrate 10 (FIG. 1) as discussed above.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

Example 1 was prepared using a polyvinyl chloride (PVC) film about 25 cm×10 cm and 0.004 inches (0.1 mm) thick; available from Klockner Pentaplast of America, Inc., Gordonsville, Va. The film had a glass transition midpoint temperature when tested by Differential Scanning Calorimeter (DSC) of 79° C.

Glass transition temperature of film specimens was measured by weighing and loading the specimens into TA Instruments aluminum standard DSC sample pans. The specimens were analyzed using the TA Instruments Q1000 (#131, Cell RC-858) Modulated® Differential Scanning Calorimeter (MDSC). The modulated method used to analyze the samples included a linear heating rate of 5° C./min. plus an applied perturbation amplitude of ±0.796° C. every 60 seconds. The specimens were subjected to a heat-cool-heat profile over a temperature range of −100 to about 175° C. The glass transition temperatures reported were evaluated using the step change in the reversing (R) heat flow (heat capacity related) curve. The onset, midpoint (half height), and end temperatures of the transition are noted, and the midpoint is the stated value.

The PVC film was coated on one side with an acrylic pressure sensitive adhesive having a dried thickness of 0.0015 inches (0.04 mm). The adhesive composition was 96 wt-% 2-methylbutyl acrylate and 4 wt-% acrylamide that was crosslinked using UV light and a benzophenone photoinitiator in a manner similar to that described in U.S. Pat. No. 4,181,752. The adhesive was coated on a silicone release liner and then transferred to the PVC film described above.

A controlled textured surface panel was prepared by laminating Regal Resin Bond Cloth Open Coat 960G, 36 grit YN sandpaper obtained from 3M Company, St. Paul, Minn. to a plywood panel using a standard contact cement. This surface has low affinity for pressure sensitive adhesives, is very consistent compared to typical textures surfaces for which this product is most suited, and it has a similar profile to a typical sand stucco surface. Lower adhesion to the surface is desired because the pressure sensitive adhesive composition influences the apparent conformability of the film. A very good pressure sensitive adhesive and/or a surface that bonds readily to the pressure sensitive adhesive can delay the onset of lifting when used with films that have a glass transition below 40° C. and use the method described herein.

The release liner was removed from the film. The adhesive coated side of the film was loosely placed using hand pressure against the textured surface panel such that the adhesive was contacting the panel and there was sufficient adhesion for the film to temporarily remain attached to the panel, but in most areas, the film was bridging indentations in the panel.

A Steinel heat gun (Model HG3002LCD; available from McMaster Carr, (600 County Line Rd., Elmhurst, Ill. 60126-2081) was set at 1000° F. (538° C.). The heat gun was held about 2 inches (5 cm) from the film surface with heating of the film in one area until the film visibly softened. Heating of the film was immediately followed by use of a 3M TSA-1 Textured Surface Applicator available from Commercial Graphics Division, 3M Company to firmly roll the film with hand pressure at about 4 inches (10 cm) per second onto the textured surface of the panel. The heat gun was moved across the film sample followed immediately by roll down of the film with the applicator.

After rolling the film against the textured surface of the panel, the film immediately cooled to the panel temperature. The film was intimately bonded to the panel and looked similar to a painted surface. The gloss of the film bonded to the panel was measured using a BYK Gardner 60° micro gloss meter (Model No 4501; available from BYK Gardner USA, 2435 Linden Lane, Silver Spring, Md.) and recorded. The panel was then placed in a 150° F. (65° C.) oven for 24 hours, removed from the oven and allowed to cool to ambient temperature and the gloss of the film measured and recorded.

Example 2 was prepared as described for Example 1, except using a clear acrylic KORAD™ film available from Spartech PEP. The film was about 25 cm×10 cm and was 0.003 inches (0.8 mm) thick. The film had a glass transition midpoint temperature when tested as described above by Differential Scanning Calorimeter (DSC) of 79° C.

The release liner was removed from the KORAD film, the film was applied to the textured surface panel, and the gloss of the film was measured as described for Example 1.

Comparative Example 1 was 3M™ Controltac™ Plus Graphic film Series 180-10 (50 micrometer thick white vinyl film with about 30 micrometers of adhesive; "180 Vinyl Film"; 3M Company). The sample size was 25 cm×10 cm and the glass transition temperature measured as described for Example 1 was 19° C. Gloss measurements were taken and recorded as described for Example 1.

Provided in Table 1 are the gloss measurements of the film samples of Examples 1 and 2 prior to application of the adhesive and the sample of 180 Vinyl Film (Initial), immediately after application of the samples to the textured surface panel and after heating in a 65° C. (150° F.) oven for 24 hours. The data in Table 1 are the mean of 18 readings at different locations on the film for each sample initially, immediately after application and after 24 hour heat aging. The standard deviations are proved in parentheses after the readings.

The actual gloss values are the mean +/−3 standard deviation units. Since individual films vary slightly in gloss, the value for comparison is a percentage of original gloss and the standard deviation for comparison is 100/initial film gloss multiplied by the measured standard deviation. The adjusted gloss values provided in Table 1 are based on 100/original gloss multiplied by the measured value.

TABLE 1

| Time of Measurement | Example 1 | Example 2 | Comparative Example 1 |
|---|---|---|---|
| Actual Gloss Values | | | |
| Initial | 82.6 | 144 | 80.7 |
| Immediately After Application | 5.2 (1.0) | 5.1 (0.8) | 4.0 (0.8) |
| After 24 Hour Heat Aging | 5.3 (1.2) | 8.8 (4.0) | 9.4 (5.0) |
| Adjusted Gloss Values | | | |
| Immediately After Application | 6.3 (1.2) | 3.6 (.6) | 5.0 (1.0) |
| After 24 Hour Heat Aging | 6.4 (1.5) | 6.1 (2.8) | 11.6 (6.2) |

TABLE 2

| Time of Measurement | Example 3 | Example 4 | Example 5 |
|---|---|---|---|
| Actual Gloss Values | | | |
| Initial | 84.0 | 77.9 | 83.0 |
| Immediately After Application | 5.1 (1.2) | 4.6 (1.4) | 3.3 (1.80) |
| After 24 Hour Heat Aging | 5.3 (5.6) | 6.5 (3.2) | 4.2 (2.2) |
| Adjusted Gloss Values | | | |
| Immediately After Application | 6.06 (1.43) | 5.90 (1.80) | 3.97 (1.20) |
| After 24 Hour Heat Aging | 6.18 (6.66) | 8.34 (4.11) | 5.06 (2.65) |
| Change % | +2 | +41 | +27 |

The data in Table 1 show that the film of Example 1 maintained substantially the same gloss value after heat aging, whereas the film of Comparative Example 1 showed a marked increase in gloss value. While the film of Example 2 showed a greater increase in adjusted gloss value than that of Example 1, the change in adjusted gloss value was still much less than the film of Comparative Example 1. Upon visual inspection, it was observed that areas of the film of Comparative Example 1 had lifted off the textured surface panel and had become planar. In general, lower gloss indicates better compliance to the textured surface panel, provided the surface finish of the film has not been damaged by the application process.

All references and publications cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below, and as they may be amended during prosecution.

Example 3, 4 & 5

A sheet of ROHAGLAS® Film Clear 99845 0.0025 in (63.45 micrometers) was laminated to an acrylic pressure sensitive laminating adhesive. This in turn was laminated to 3M™ Controltac™ Plus Graphic film Series 180-10 as described in Example 2. The composite was adhered to the Regal Resin Bond Cloth Open Coat 960G as in Example 1. The gloss of the composite was measured before application, after application, and after aging for 24 hours at 150° F. (65° C.). An example was prepared with 3M™ Scotchcal™ Luster Overlaminate 8519, (Example 4) which is a plasticized PVC with a Tg of less than 30° C. Another example (Example 5) was 3M™ Controltac™ Plus Graphic film Series 180-10 with no overlaminate. All samples were applied to the Regal Resin Bond Cloth Open Coat 960G, 36 grit YN sandpaper as in Example 1. Table 2 below shows the gloss change upon heat aging.

We claim:

1. A method of adhering a graphic film on an irregular substrate having a non-planar surface, the method comprising steps of:
    providing a polymer film composite having two or more layers with at least one layer having a glass transition temperature of at least about 40° C., the polymer film composite having a first side and a second side, an adhesive layer disposed on the second side, and wherein the polymer film composite comprises one or more layers of a polymer with a glass transition temperature of at least 40° C. and one or more layers of a polymer film of with a glass transition temperature of less than 30° C.;
    positioning the adhesive layer against the irregular substrate;
    heating the polymer film composite to the glass transition temperature to form a heated polymer film; and
    pressing the heated polymer film against the irregular substrate and conforming the heated polymer film to the non-planar surface.

2. The method of claim 1, further comprising printing, an image on the first side.

3. The method of claim 1, further comprising printing an image on the second side prior to disposing the adhesive layer on the second side.

4. The method of claim 1, further comprising printing an image between the layers of the polymer film composite.

5. The method of claim 1, wherein the pressing step comprises pressing the heated polymer film composite against the irregular substrate with a foamed or sponge rubber.

6. The method of claim 1, wherein the polymer film composite comprises a colored film layer.

7. A method of adhering a film on an irregular substrate having a non-planar surface, the method comprising steps of:
    providing a first polymer film having a glass transition temperature of less than about 30° C., polymer film having a first side and a second side, an adhesive layer disposed on the second side;
    providing a second polymer film having a glass transition temperature of at least about 40° C.;
    laminating the second polymer film to the first polymer film to form a polymer film composite;
    positioning the adhesive layer of the first polymer film against the irregular substrate;
    heating the polymer film composite to the second polymer film glass transition temperature to form a heated polymer film; and pressing the heated polymer film against the regular substrate and conforming the heated polymer film to the non-planar surface.

8. The method of claim 7, further comprising printing an image on the first polymer film prior to the laminating step.

9. The method of claim 8, wherein the image is printed with piezo printing.

10. The method of claim 7, wherein the pressing step comprises pressing the heated polymer film composite against the irregular substrate with a foamed or sponge rubber.

11. A method of adhering a film on an irregular substrate having a non-planar surface, the method comprising steps of:
providing a first polymer film having a glass transition temperature of less than about 30° C., the polymer film having a first side and a second side, an adhesive layer disposed on the second side;
printing an image on the first side;
providing a second polymer film having a glass transition temperature of at least about 40° C.;
laminating the second polymer film to the first polymer film over the image to form a polymer film composite;
positioning the adhesive layer of the first polymer film against the irregular substrate;
heating the polymer film composite to the second polymer film glass transition temperature to form a heated polymer film; and
pressing the heated polymer film against the irregular substrate and conforming the heated polymer film to the non-planar surface.

12. The method of claim 11, wherein the pressing step comprises pressing the heated polymer film composite against the irregular substrate with a foamed or sponge rubber.

13. The method of claim 11, wherein the first polymer film is a plasticized polyvinyl chloride film.

14. The method of claim 11, wherein the laminating step is facilitated by a combination of heat and pressure, a heat activated adhesive, or by using a pressure sensitive adhesive.

* * * * *

UNITED STATES PATENT AND TRADEMARK OFFICE
CERTIFICATE OF CORRECTION

PATENT NO.         : 8,778,122 B2
APPLICATION NO.    : 11/682256
DATED              : July 15, 2014
INVENTOR(S)        : Ronald Steelman et al.

It is certified that error appears in the above-identified patent and that said Letters Patent is hereby corrected as shown below:

In the Claims

Column 12
Line 41, in Claim 1, delete "printing," and insert -- printing --, therefor.

Line 56, in Claim 7, after "30° C.," insert -- the --.

Column 13
Line 1, in Claim 7, delete "regular" and insert -- irregular --, therefor.

Signed and Sealed this
Nineteenth Day of May, 2015

Michelle K. Lee
*Director of the United States Patent and Trademark Office*